(12) United States Patent
Balmelli et al.

(10) Patent No.: US 7,373,343 B2
(45) Date of Patent: May 13, 2008

(54) REQUIREMENTS MANAGEMENT SEMANTICS MODELING

(75) Inventors: Laurent L. Balmelli, White Plains, NY (US); Fausto Bernardini, New York, NY (US); Olga Golovenevsky, Haifa (IL); Jose Gomes, Douglaston, NY (US); Mila Keren, Nesher (IL); Abraham Zehavi, Nahariya (IL)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/104,159

(22) Filed: Apr. 12, 2005

(65) Prior Publication Data

US 2006/0230034 A1    Oct. 12, 2006

(51) Int. Cl.
*G06F 7/06* (2006.01)
(52) U.S. Cl. .......................................... 707/4
(58) Field of Classification Search ............... 707/4
See application file for complete search history.

(56) References Cited

U.S. PATENT DOCUMENTS

| 6,345,381 | B1* | 2/2002 | Leight et al. ............... 716/18 |
| 6,437,041 | B1* | 8/2002 | Bosch et al. .............. 524/506 |
| 6,466,898 | B1* | 10/2002 | Chan ......................... 703/17 |
| 6,493,852 | B1* | 12/2002 | Narain et al. ............... 716/5 |
| 2005/0220518 | A1* | 10/2005 | Priebe ...................... 399/390 |
| 2007/0083501 | A1* | 4/2007 | Pedersen et al. .............. 707/4 |

* cited by examiner

*Primary Examiner*—Chong H Kim

(57) ABSTRACT

Described is a method and system of requirements management including the expression in a requirements management tool of a relationship selected from the group consisting of a satisfaction relationship, an alternative relationship, a conflict relationship, and a constant dependency relationship.

Described is a requirements management method including a first automatic analyzing of a requirements set to find conflicts, having a conflict free requirements subset, and a second automatic analyzing of the requirements set to verify completeness.

13 Claims, 4 Drawing Sheets

REQUIREMENTS MANAGEMENT SEMANTICS MODELING

FIELD OF THE INVENTION

The present invention relates to requirements management in general, and more particularly to semantics modeling for requirements management.

BACKGROUND OF THE INVENTION

Requirements governing the development of various types of products have grown as the complexity of these products has increased. Any heterogeneous system (e.g. one built from different types of components) can be defined by a set of requirements documents with which the developed product must comply. Such systems exist in many types of manufacturing and product development such as automotive, military, aerospace, and complex medical systems. Exemplary products may contain such components as computer software programs, computer hardware, semiconductors, mechanical and electrical products, etc. Requirements are often formulated in documents and are partitioned into pieces of text called individual requirements. The requirements are often represented hierarchically.

In requirements management, the refinement and facilitation of requirements are considered in conjunction with the development of a design. The process of requirements specification is an iterative process in which increasingly detailed requirements are produced by the refinement of previously defined requirements. The development of a design generally begins from a set of initial requirements. As the design process progresses, the initial requirements are extended with intermediate design decisions, usually called "derived" requirements. These requirements are added to the whole set of requirements. During the design procedure, further requirements may be elucidated. Managing changes and/or additions to the initial or derived requirements or design often leads to inconsistencies in the requirement and/or design.

Requirements management tools exist some of which are integrated with design management tools. Two exemplary products are DOORS® (available from Telelogic® at http://www.telelogic.com/) and RequisitePro® (available from IBM® Rational® at http://www.ibm.com).

These tools provide basic infrastructure for capturing and selecting requirements, and for connecting requirements to design elements. However, since these tools only allow one general link type between requirements, usually only a simple hierarchy that reflects the structural elements of the requirements document, such as paragraphs, sections, chapters, and enumerations is shown. It is not possible with only one link type to show logical relationships between requirements. A user may wish to assign different roles to links however all the links look the same and there is no way to enter or save such information, hence the user must remember what each link represents.

These tools may also address some primitive forms of impact analysis and traceability problems but the lack of granularity in the definition of relationships prevents an accurate impact analysis from being performed and only step by step tracing between requirements is possible. These tools are further limited in that only whole sets of requirements can be analyzed. There are tools that can determine if all of the requirements are linked to design elements either directly or indirectly, but no analysis is possible on a subset of the requirements.

SUMMARY

Applicants have disclosed a semantic for requirements management comprising four relationship types: conflict, alternative, satisfaction and content dependency. The semantic of the present invention may capture logical relationships between various combinations of requirements (that may have been initially captured from a text document) and optionally design decisions (that may have been produced through design development). The set of initial plus derived requirements may represent a detailed design solution for implementation of the initial requirements.

A system comprising the semantic of the present invention may allow an automatic analysis of a possibly partial requirement set (built up from initial requirements and design solutions) for completeness and a lack of conflicts. A system comprising the semantic of the present invention may allow an automatic impact analysis in the event of a change in either the requirements or design. Furthermore, the semantic of the present invention may keep a history of derived requirements and design decisions with the requirements set, which may include those decisions not chosen.

A method and system of requirements management including the expression in a requirements management tool of a relationship selected from the group consisting of a satisfaction relationship, an alternative relationship, a conflict relationship, and a content dependency relationship.

A requirements management system and method including a first automatic analyzing of a requirements set to find conflicts, having a conflict free requirements subset and a second automatic analyzing of the requirements set to verify completeness.

A requirements management design change propagation method and system including having an implemented first subset of a requirements set, receiving a subset of changed design elements, using a set of predefined satisfaction rules to generate a second subset of the requirements set including all the requirements in the requirements set that are satisfied when the implemented first subset is satisfied, generating a third subset of the requirements including those requirements directly linked to the subset of changed design elements, creating a fourth subset of the requirements by removing from the first subset of the requirements set those requirements included in the third subset of the requirements set, generating a fifth subset of the requirements by propagating the fourth subset of the requirements through the set of predefined satisfaction rules, comparing requirements included in the fifth subset with those included in the second subset, and generating a set of requirements that may no longer be satisfied.

A requirements management requirements change propagation method and system including having an implemented first subset of a requirements set, receiving a changed subset including the set of changed requirements, using a set of predefined content dependency rules and the changed subset to generate a seventh subset of the requirements set including all requirements in the requirements set the content of which may be changed as a result of the changes in the requirements in the changed subset, and creating a subset of changed design elements by selecting those design elements that are linked directly to the requirements included in the seventh subset, and wherein the change design element set is used with the design change propagation method and system to create and eighth subset of requirements that may be no longer satisfied.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings, in which:

Figure 1A:
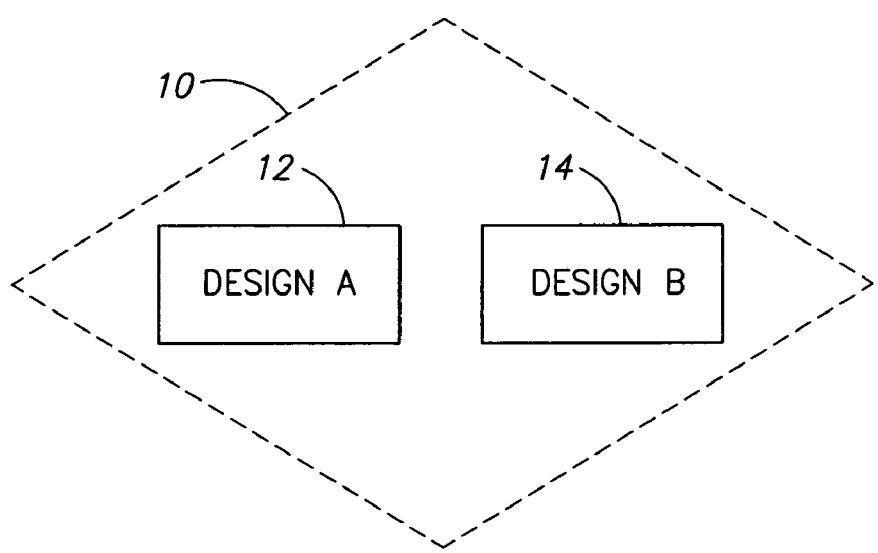
FIGS. 1A-1D are block diagram illustrations of an alternative, conflict, satisfaction, and content dependency relationship respectively, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

General

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose products may be used with programs in accordance with the teachings herein, or it may prove convenient to construct a more specialized apparatus to perform the desired method. The desired structure for a variety of these products will appear from the description below. In addition, embodiments of the present invention are not described with reference to any particular programming language. It will be appreciated that a variety of programming languages may be used to implement the teachings of the invention as described herein.

Description of the Semantic

In the description hereinbelow, the term "completeness" means that a selected subset of requirements guarantees satisfaction of the set of initial requirements.

Applicants have disclosed a semantic for requirements management comprising four relationship types: conflict, alternative, satisfaction and content dependency. The semantic of the present invention may capture logical relationships between various combinations of requirements (that may have been initially captured from a text document) and optionally design decisions (that may have been produced through design development). The set of initial plus derived requirements may represent a detailed design solution for implementation of the initial requirements.

A system comprising the semantic of the present invention may allow an automatic analysis of a possibly partial requirement set (built up from initial requirements and design solutions) for completeness and a lack of conflicts. A system comprising the semantic of the present invention may allow an automatic impact analysis in the event of a change in either the requirements or design. Furthermore, the semantic of the present invention may keep a history of derived requirements and design decisions with the requirements set, which may include those decisions not chosen.

Definition of the Four Types Comprising the Semantic

FIG. 1A, to which reference is now made, is a block diagram illustration of an exemplary "alternative" relationship, in accordance with an embodiment of the present invention. An alternative relationship, depicted by dashed diamond 10, may comprise more than one alternative initial or derived requirement. The requirements may comprise, for example, a requirement box 12 comprising design A and a requirement box 14 comprising design B. Alternative relationships embody different options, any of which may be implemented in the design. Having one of these options selected for implementation, others may be left unimplemented. In an embodiment of the present invention, information about non-selected options may be preserved. This information may be useful, for example, if changes are necessary, for historical purposes, and/or for product specification as explained hereinbelow.

Figure 1B:
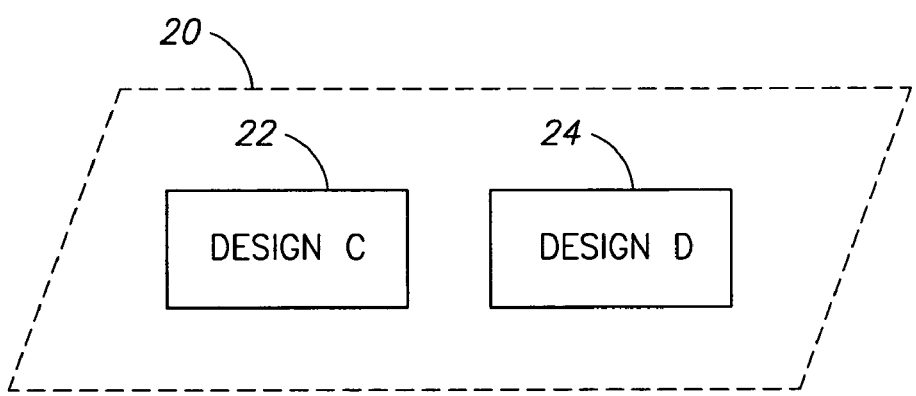

Reference is now made to FIG. 1B, a block diagram illustration of an exemplary "conflict" relationship, in accordance with an embodiment of the present invention. A conflict relationship, depicted by dashed parallelogram 20, may comprise at least two conflicting initial or derived requirements. The requirements may comprise a requirement box 22 comprising design C and a requirement box 24 comprising design D. A conflict relationship exists between requirements or sets of requirements when their states are mutually exclusive and thus cannot be implemented in the same design.

Figure 1C:
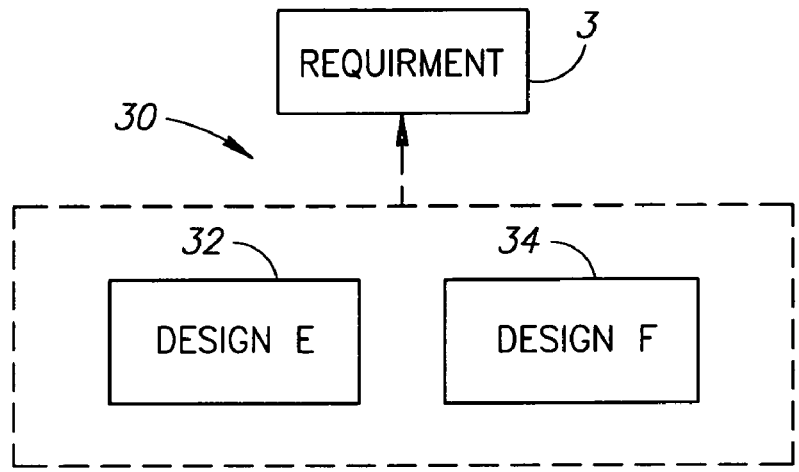

Reference is now made to FIG. 1C, a block diagram illustration of an exemplary "satisfaction" relationship, in accordance with an embodiment of the present invention. A satisfaction relationship, depicted by the dashed box and up-arrow 30, may comprise a set of at least one initial or derived requirement wherein the set may satisfy at least one requirement. For example, two different derived requirements may be proposed, requirement box 32 comprising design E and requirement box 34 comprising design F. These may be surrounded by a solid box and connected to a requirement box 3 by a solid arrow. A satisfaction relationship exists when satisfaction of one group of requirements guarantees satisfaction of requirements from another group, for example, requirement box 32 and requirement box 34 together may satisfy requirement box 3.

In a satisfaction relationship, it may be expected that the more-detailed requirements must satisfy less detailed requirements. This relationship shows that one requirement is stronger or equivalent to another. For example, there may be two requirements relating to the radius of a wheel. The first requirement is that "the radius of the wheel should be less than 0.5 meter". The second requirement is that "the radius of the wheel should be less than 0.6 meter". In this example, the first requirement is stronger than the second requirement since the requirement is more rigorous. Hence, satisfaction of the first requirement provides satisfaction of the second.

Satisfaction relationships may exist either between initial and/or derived requirements, or between requirements generated on different design levels. In an embodiment of the present invention, capturing satisfaction relationships may allow the selected subset to contain only the most detailed requirements assuring satisfaction. This may reduce the number of links that must be stored between requirements and design elements, while the logical connectivity to the other requirements and/or design choices may be preserved.

Figure 1D:
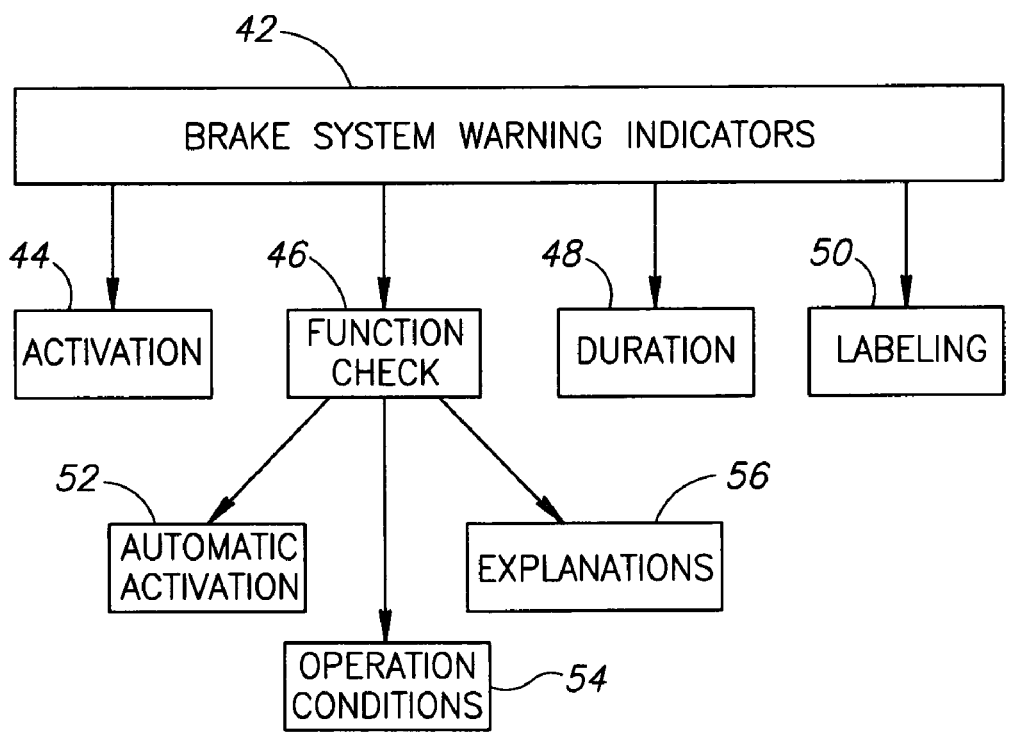

Reference is now made to FIG. 1D, a block diagram illustration of an exemplary "content dependency" relationship, in accordance with an embodiment of the present invention. A content dependency relationship exists between requirements when a change in the content of one requirement may potentially bring a change in content of another requirement. A requirement box 42 comprising a requirement for "brake system warning indicators" may be connected to four requirements that describe details or properties of warning indicators. The derived requirements may comprise a requirement box 44 comprising a requirement of "activation", a requirement box 46 comprising a requirement of a "function check", a requirement box 48 comprising a requirement of "duration", and a requirement box 50 comprising a requirement of "labeling". Function check (requirement box 46) may have three further requirements: "automatic activation" (requirement box 52), "operation conditions" (requirement box 54), and "explanations" (requirement box 56).

If the requirement for "brake system warning indicators" (requirement box 42) is changed, then all the derived requirements, requirements boxes 44-56, may need to be changed. The content dependency relationship in this case comprises all of the derived requirements. If the requirement for "function check" (requirement box 46) is changed, then only the requirements in boxes 52-56, may need to be changed. In this case, the content dependency relationship comprises only the derived requirements of "function check". In an embodiment of the present invention, the content dependency relationship may be used for requirements change propagation.

Use of the Semantic

During the development of a design by the method of requirements driven design, initial requirements may have been captured from a text document. A user may check the set of initial requirements for conflicts. Conflicts may occur, for example, if more than one source for requirements is used. The user may determine alternative requirements, for example, requirements that contain a logical "or". The user may enter any conflict and alternative relationships found. On each level of development, the requirements may be further detailed and extended. The set of initial plus derived requirements may represent a detailed design solution for implementation of the initial requirements.

In an embodiment of the present invention, the initial requirement set may comprise the initial requirements plus any alternative and conflict relationships, wherein the relationships may be included in the representation of the requirements and may be stored with them. A subset of requirements relevant to a given level of design may be selected by a user. As the user details the requirements for the level, any relationships between the requirements in the subset may be input, for example, alternative and satisfaction relationships. The requirements may further be connected to the corresponding design elements. In an embodiment of the present invention, a single application may be used to store all requirements, designs, and relationships for whole system.

Figure 2:
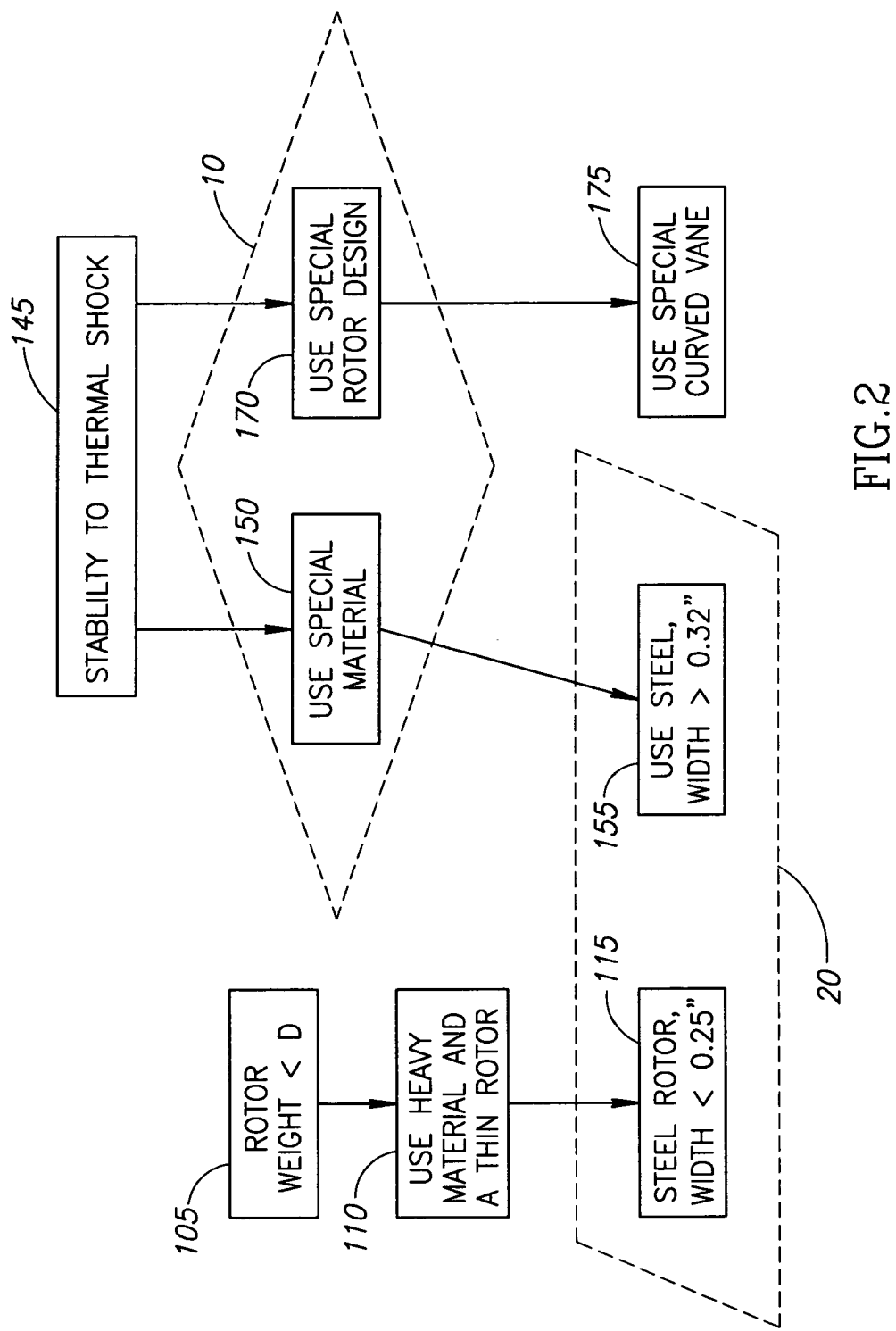
FIG. 2 is a block diagram illustration of a subset of requirements comprising an alternative and a conflict relationship, in accordance with an embodiment of the present invention.

Reference is now made to FIG. 2, a block diagram illustration of an exemplary subset of requirements for a rotor in a braking system comprising an alternative and a conflict relationship, in accordance with an embodiment of the present invention. There may be two different initial requirements one relating to material composition and the other to thermal shock. The requirement regarding material composition may relate to rotor weight, for example, that the weight of the rotor be less than some value "d" (box 105). As the requirements are defined in increasing detail, an intermediate requirement, for example, that a heavy material be used in conjunction in a thin rotor may be created (box 110). Finally, it may be decided to use a steel rotor, with a width of less than 0.25 inches (box 115).

The requirement regarding thermal shock may relate to the stability of the rotor to thermal shock (box 145). Two different alternatives may fulfill this requirement the use of a special material (box 150) or the use of a special rotor design (box 170). The ability of either of these requirements to fulfill the initial requirement is depicted by dashed diamond 10. Each of these requirements may be further specified. "Use of a special material" (box 150) may be further detailed as the use of a steel rotor of width>0.32 inches (box 155). "Use of a special rotor design" (box 170) may be further detailed as the use of a special curved vane (box 175).

Analysis of all rotor requirements may reveal that the requirements depicted by boxes 115 and 155 are in conflict. Satisfaction of all the requirements as designated would require that the rotor width be both less than 0.25 inches and greater than 0.32 inches. The impossibility of fulfilling both of these requirements in the same design is depicted by dashed parallelogram 20. Once a conflict in the requirements for a steel rotor has been determined, it may be necessary to find which of the higher-level requirements led to the conflict and find an alternate solution for at least one of them.

At the completion of the design of a level, two checks may be made: the absence of conflicts and the completeness or coverage of the requirements. A system comprising the semantic of the present invention may comprise an automatic analysis of a possibly partial requirement set and optionally the related design decisions for completeness and a lack of conflicts. Analysis for completeness may use the conflict, alternative, and satisfaction relationships as explained hereinbelow.

In an embodiment of the present invention, alternative information may have been saved. In such a case, an alternative may automatically be selected if a conflict is found. Hence, in the case of FIG. 2, alternative 170 may be suggested instead of 150. Now there may be no conflict. The rotor requirements are for a steel rotor of width less than 0.25 inches with a special curved vane.

Requirements may be developed by different design teams, which may lead to conflicts. In an embodiment of the present invention, requirements may be attached to design elements. Both requirement box 115 and box 155 may be attached to a wheel design element (not shown). The resulting conflict may be detected when the wheel element is reviewed. The conflict may then be marked by the user and the need for a design change propagated up to the requirements as described hereinbelow.

Figure 3:
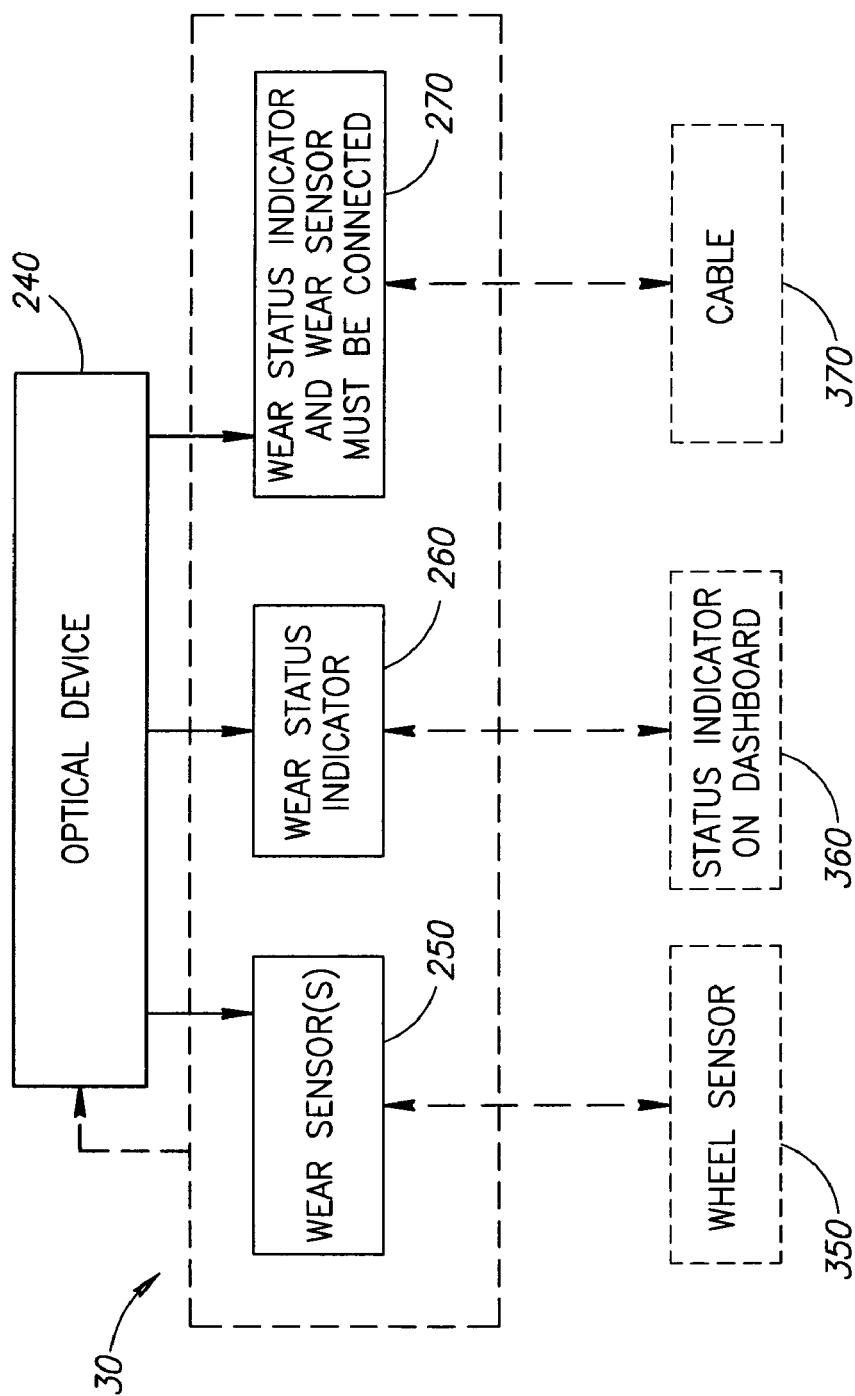
FIG. 3 is a block diagram illustration of a subset of requirements comprising a satisfaction relationship and a link to design elements, in accordance with an embodiment of the present invention.

Reference is now made to FIG. 3, a block diagram illustration of an exemplary subset of requirements for an optical device showing brake pad wear comprising a satisfaction relationship and, in accordance with an embodiment of the present invention. An initial requirement may be "optical device" (240). Three requirements may be defined: a sensor(s) to detect wear in the brake pad (250), an indicator to signal wear status (260), and that wear sensor (250) and wear indicator (260) must be connected (270). Each of these three requirements must be met. In satisfying all three of these requirements, it is guaranteed that the parent requirement (240) is met, as is shown by satisfaction relationship 30.

Each requirement is further connected to a design element by a link, which may be depicted by a double-headed dashed arrow. Design elements may be represented by dashed boxes. Wear sensor(s) requirement 250 is connected to a wheel sensor 350. Wear status indicator requirement 260 is connected to a status indicator on the dashboard 360. Connection requirement 270 is connected to a cable 370.

Semantic Specification

The semantic of the present invention may be specified in a rule-based language. An exemplary set of requirements a, b, c, and d, may comprise either derived and/or initial requirements. The following set of rules may be defined for the alternative, satisfaction, conflict, and content dependency relationships.

1. Alternative rules: If alt (a,b,c) it is sufficient to select one of requirements a, b or c. If alt ({a,b}, c) it is sufficient to select either [requirements a and b] or [requirement c] for implementation in design.
2. Satisfaction rules: If s(a)→s(b) then if requirement a is satisfied, then requirement b is also satisfied. If s(a,b)→s(c) then if requirements a and b are satisfied, then requirement c is satisfied.
3. Conflict rules: If cnf (a,b,c) then requirements a, b and c cannot be implemented in design simultaneously. If cnf ({a,b},c) then both requirements a and b cannot be implemented simultaneously with requirement c, whereas one of requirements a and b may be.
4. Content dependency rules: If cd(a)→b then if there is a change in requirement a, then a change may be needed to requirement b. If cd(a,b)→c then if there is a change in both a and b, then a change may be needed to requirement c.

Analysis for Conflicts and Completeness

As mentioned hereinabove, whenever the requirements and/or design specifications are changed or added to, it is important that the specification sets remain free of conflicts and are complete for the current level. Hence, it is crucial to maintain connections between different subsystems and subsets of subsystems. A system comprising the semantic of the present invention may allow an automatic examination of a requirements subset for conflicts and completeness. Analysis for the absence of conflicts may use the satisfaction and conflict relationships. If there are conflicts, the groups of conflicting requirements may be specified. Analysis for completeness may check the guarantee of satisfaction of the initial requirements and may use the satisfaction and alternative relationships. If the subset is not complete, a set of complementary requirements may be suggested.

In an embodiment of the given invention, given A, a subset of requirements selected for implementation the following analysis may be performed. First, based on the selected subset A and the predetermined satisfaction rules, find all the requirements in the entire set of requirements that are satisfied when the selected subset is satisfied. This may comprise propagating through the satisfaction rules starting from the selected subset of requirements with the found subset denoted B. For example, if s(a)→s(b) and requirement a is in A and requirement b is not, then a and b will be in B.

In an embodiment of the given invention, conflict analysis may comprise checking subset B against the predefined conflict rules. If there is a conflict rule that comprises more than one requirement (or set of requirements) that are included in B, then a conflict exists. The requirements that conflict may be reported. For example, given cnf (a,b,c), if requirements a and b are comprised in B, then a conflict exists and requirements a and b may be reported as conflicting.

When all conflicts have been resolved manually by a user, the subset A may be re-selected so as to be free of conflicts and subset B may be recalculated, which may allow the completeness of selected subset A to be checked. This may be done by checking subset B against the predefined alternative rules. If all of the initial requirements are comprised in subset B, then the selection is complete. However, if there are initial requirements that are not comprised in B, then those missing requirements may be checked against the predefined alternative rules. If the alternative rules in which they appear are satisfied by other requirements comprised in B, then the selected subset is complete. However, if initial requirements remain unsatisfied, they may be reported as non-covered and subset A is not complete. For example, given alternative rule alt (a,b,c) wherein requirement b is comprised in B, but requirements a and c are not. If requirement a is an initial requirement, then alternative rule alt (a,b,c) is satisfied by means of b and the selected subset A is complete.

Change Propagation

A system comprising the semantic of the present invention may allow an automatic impact analysis in the event of a change in either requirements or design elements. Use of a single application to store requirements and design elements may allow analysis of all impacts to requirements or design elements. In an embodiment of the present invention, the content dependency and satisfaction relationships may be used for requirements change propagation. In an embodiment of the present invention, the satisfaction relationship may be used for design element propagation.

If a change is made to a requirement, a search of requirements and elements of design that may be impacted may be made automatically. Analysis may begin at the requirements that are changed and any other requirements and design elements that may be impacted may be highlighted.

In an embodiment of the present invention, a subset A may be selected for implementation on the current design level. Once it was selected, each requirement comprised in A is connected to the design elements that satisfy this requirement.

Phase 1: The set of changed requirements may be denoted E. Then starting from the set E using the predefined content dependency rules, a set D of all potentially changed requirements may be generated. For example, if $cd(a,b) \rightarrow c$, where a, b and c are requirements and a and b are comprised in E, then a, b and c will be included in D. All potentially changed elements of design may be found by first looking for those requirements in D which were selected for implementation (i.e. were included in subset A). The design elements linked to such requirements are those that may be impacted by the change. These design elements may be reported as a result of this analysis.

Phase 2: starting from the set of possibly changed design elements found in phase one of this algorithm, the design change analysis algorithm described hereinbelow may be used to find the set E, which may comprise all requirements that may be not satisfied due to this change. Finally, sets D and E that have been generated by this method may be reported, possibly as two distinct sets.

If a change is made to a design element, a search of requirements that might be impacted may be made automatically. Analysis may begin with the design elements that are changed and may comprise finding the requirement to which each design element is attached and highlighting all the requirements that may no longer be satisfied due to the changes made.

Given a set A of requirements selected for implementation on the current level of development. Those requirements that are directly linked to the changed design elements are selected and denoted as L. Those requirements comprised in set L are removed from set A. The satisfaction rules are propagated through twice: first starting with the selected set A, and second starting from the set A from which the requirements from L were removed. The requirements that appear as a result of the first propagation and do not appear as a result of the second are those that are not satisfied anymore. They may be reported as a result of this analysis along with requirements from L.

For example, given satisfaction rule $s(a,b,c) \rightarrow s(d)$. If requirements a, b, and c were satisfied as a result of the first propagation, but requirement a is no longer satisfied as result of the second, then requirement d is not satisfied any more. An exception may be the case of requirement d being explicitly selected into A when requirement d is not linked to the changed design element.

Implementation

The semantic and automatic analysis methods may be implemented on top of any requirements management and design development tools existing in the prior art that provide an extensibility interface. For example, the introduced semantics and suggested analysis methods may be implemented on the top DOORS® and RequisitePro®.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A requirements management method comprising:
   a first automatic analyzing of a requirements set to find conflicts;
   having a conflict free requirements subset; and
   a second automatic analyzing of the requirements set to verify completeness thereby providing related design decisions for completeness and a lack of conflicts.

2. The method of claim 1 wherein said first analyzing comprises:
   selecting a first subset of the requirements set for implementation; and
   using a set of predefined satisfaction rules to generate a second subset of the requirements set comprising all the requirements in the requirements set that are satisfied when the first subset is satisfied; and
   checking the second subset against the predefined conflict rules to find conflicting requirements.

3. The method of claim 2 and further comprising reporting the found conflicting requirements.

4. The method of claim 1 wherein said second analyzing comprises:
   using a set of predefined satisfaction rules to generate a third subset of the requirements set comprising all the requirements in the requirements set that are satisfied when the conflict free requirements subset is satisfied; and
   checking the third subset against the set of all initial requirements to generate a set of missing initial requirements comprising initial requirements which are not contained in the third subset.

5. The method of claim 4 wherein the set of missing initial requirements is an empty set and further comprising reporting completeness of the conflict free requirements subset.

6. The method of claim 4 wherein the set of missing initial requirements is not empty and further comprising:
   checking members of the set of missing initial requirements against the predefined set of alternative rules;
   finding members of the set of missing initial requirements which are comprised in at least one alternative rule which is satisfied by other requirements in third subset and removing them from the set of missing initial requirements;
   if the set of missing initial requirements is now an empty set further comprising reporting completeness of the conflict free requirements subset; and
   if the set of missing initial requirements is still not an empty set reporting the non-covered requirements.

7. A requirements management design change propagation method comprising:
   having an implemented first subset of a requirements set;
   receiving a subset of changed design elements;

using a set of predefined satisfaction rules to generate a second subset of the requirements set comprising all the requirements in the requirements set that are satisfied when the implemented first subset is satisfied;

generating a third subset of the requirements comprising those requirements directly linked to the subset of changed design elements;

creating a fourth subset of the requirements by removing from the first subset of the requirements set those requirements comprised in the third subset of the requirements set;

generating a fifth subset of the requirements by propagating the fourth subset of the requirements through the set of predefined satisfaction rules;

comparing requirements comprised in the fifth subset with those comprised in the second subset;

generating a set of requirements that may no longer be satisfied and;

providing related design decisions for completeness and a lack of conflicts.

8. The method of claim 7 and further comprising reporting the set of design elements directly linked to the third subset of the requirements set.

9. The method of claim 7 comprising reporting the set of requirements that may no longer be satisfied.

10. The method of claim 7, wherein after said having an implemented first subset of a requirements set, said method further comprising requirements change propagation:

receiving a changed subset comprising the set of changed requirements;

using a set of predefined content dependency rules and the changed subset to generate a seventh subset of the requirements set comprising all requirements in the requirements set the content of which may be changed as a result of the changes in the requirements in the changed subset; and creating a subset of changed design elements by selecting those design elements that are linked directly to the requirements comprised in the seventh subset;

and wherein said receiving a subset of changed design elements is receiving the change design element set created by said creating and said method is used for design change propagation comprising an eighth subset of requirements that may be no longer satisfied.

11. The method of claim 10 and further comprising reporting the seventh subset of the requirements set.

12. The method of claim 10 and further comprising reporting the change design element set.

13. The method of claim 10 and further comprising reporting the eighth subset of the requirements set of requirements that may be no longer satisfied.

* * * * *